US010852053B2

(12) United States Patent
Seo et al.

(10) Patent No.: US 10,852,053 B2
(45) Date of Patent: Dec. 1, 2020

(54) REFRIGERATOR

(71) Applicant: Samsung Electronics Co., Ltd., Suwon-si (KR)

(72) Inventors: Yong Bum Seo, Hwaseong-si (KR); Keon Pyo Koo, Hwaseong-si (KR); Chun Youp Shin, Suwon-si (KR); Woo Yeol Yoo, Suwon-si (KR); Jeong Hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/581,997

(22) Filed: Apr. 28, 2017

(65) Prior Publication Data
US 2017/0234602 A1    Aug. 17, 2017

Related U.S. Application Data

(63) Continuation of application No. PCT/KR2016/009684, filed on Aug. 31, 2016.

(30) Foreign Application Priority Data

Sep. 1, 2015   (KR) .................. 10-2015-0123374
Dec. 28, 2015  (KR) .................. 10-2015-0187932

(51) Int. Cl.
*F25D 23/02*      (2006.01)
*H04N 7/18*       (2006.01)
(Continued)

(52) U.S. Cl.
CPC ............ *F25D 23/028* (2013.01); *F21V 33/00* (2013.01); *F25D 11/00* (2013.01); *F25D 23/02* (2013.01);
(Continued)

(58) Field of Classification Search
CPC ...... H04N 7/181; H04N 7/183; F25D 23/028; F25D 11/00; F25D 23/12; F25D 25/02;
(Continued)

(56) References Cited

U.S. PATENT DOCUMENTS 9,568,241 B2 *   2/2017   Kim .................... G06K 9/6201
2002/0067424 A1 * 6/2002  Brunner, Jr. .......... B64D 47/08
                                                       348/373
(Continued)

FOREIGN PATENT DOCUMENTS

JP      2003042626 A  *  2/2003
JP      2003042626 A  *  2/2003
(Continued)

OTHER PUBLICATIONS

International Search Report dated Nov. 24, 2016 in corresponding International Application No. PCT/KR2016/009684.
(Continued)

*Primary Examiner* — Maria E Vazquez Colon
(74) *Attorney, Agent, or Firm* — Staas & Halsey LLP

(57) ABSTRACT

Disclosed herein is a refrigerator which includes: a main body having an opening, and including a storage chamber therein; a door configured to open or close the opening; a camera unit disposed in the door, and configured to photograph the storage chamber, wherein the camera unit faces the storage chamber selectively by interworking with opening or closing of the door. With this configuration, it may look in the storage chamber of the refrigerator without opening any door and minimize exposure of the camera unit to the outside.

13 Claims, 16 Drawing Sheets

(51) Int. Cl.
*F21V 33/00* (2006.01)
*F25D 11/00* (2006.01)
*F25D 23/12* (2006.01)
*F25D 25/02* (2006.01)
*F25D 29/00* (2006.01)

(52) U.S. Cl.
CPC ............ *F25D 23/12* (2013.01); *F25D 25/02* (2013.01); *H04N 7/181* (2013.01); *H04N 7/183* (2013.01); *F25D 29/00* (2013.01); *F25D 2323/021* (2013.01); *F25D 2400/02* (2013.01); *F25D 2400/36* (2013.01); *F25D 2700/06* (2013.01)

(58) Field of Classification Search
CPC ........... F25D 2323/021; F25D 2400/02; F25D 2400/36; F25D 2700/06; F25D 29/00; F25D 23/02; F21V 33/00
See application file for complete search history.

(56) References Cited

U.S. PATENT DOCUMENTS

| | | | | |
|---|---|---|---|---|
| 2005/0046319 | A1* | 3/2005 | Chekal | F25D 11/02 312/401 |
| 2013/0241385 | A1* | 9/2013 | Lee | F25D 23/028 312/404 |
| 2016/0123657 | A1* | 5/2016 | Kim | F25D 29/00 62/125 |
| 2016/0182864 | A1* | 6/2016 | Izawa | H04N 5/44 348/159 |

FOREIGN PATENT DOCUMENTS

| | | | |
|---|---|---|---|
| JP | 2003-207258 | | 7/2003 |
| JP | 2014163585 A | * | 9/2014 |
| JP | 2014196839 A | * | 10/2014 |
| JP | 2015-111026 | | 6/2015 |
| JP | 2015-148366 | | 8/2015 |
| JP | 2015148366 A | * | 8/2015 |
| KR | 10-1999-0046214 A | | 7/1999 |
| KR | 10-2001-0037549 A | | 5/2001 |
| KR | 10-2010-0065968 A | | 6/2010 |
| KR | 10-2015-0032404 A | | 3/2015 |
| KR | 2015-111026 | | 6/2015 |
| KR | 10-2015-0084265 A | | 7/2015 |
| KR | 2015-148366 | | 8/2015 |
| KR | 10-2015-0132264 A | | 11/2015 |
| WO | 2014/142118 A1 | | 9/2014 |
| WO | 2014/142119 A1 | | 9/2014 |
| WO | 2014/155935 | | 10/2014 |

OTHER PUBLICATIONS

Written Opinion dated Nov. 24, 2016 in corresponding International Application No. PCT/KR2016/009684.
Office Action dated Dec. 28, 2017, in corresponding Korean Patent Application No. 10-2015-0187932, 7 pgs.
Office Action dated Feb. 5, 2018, in corresponding Korean Patent Application No. 10-2015-0187932, 8 pgs.
Office Action issued in copending Korean Patent Application No. 10-2015-0187932 dated May 17, 2017.
European Office Action dated Jul. 19, 2018 in corresponding European Patent Application No. 16842261.6.
European Communication dated May 27, 2019 in European Patent Application No. 16842261.6.
European Communication dated Apr. 11, 2019 in European Patent Application No. 16842261.6.
European Office Communication dated Apr. 21, 2020 in European Patent Application No. 16842261.6.
Chinese Office Action dated Aug. 7, 2020 in Chinese Patent Application No. 201680048861.4.

* cited by examiner

[Fig. 1]
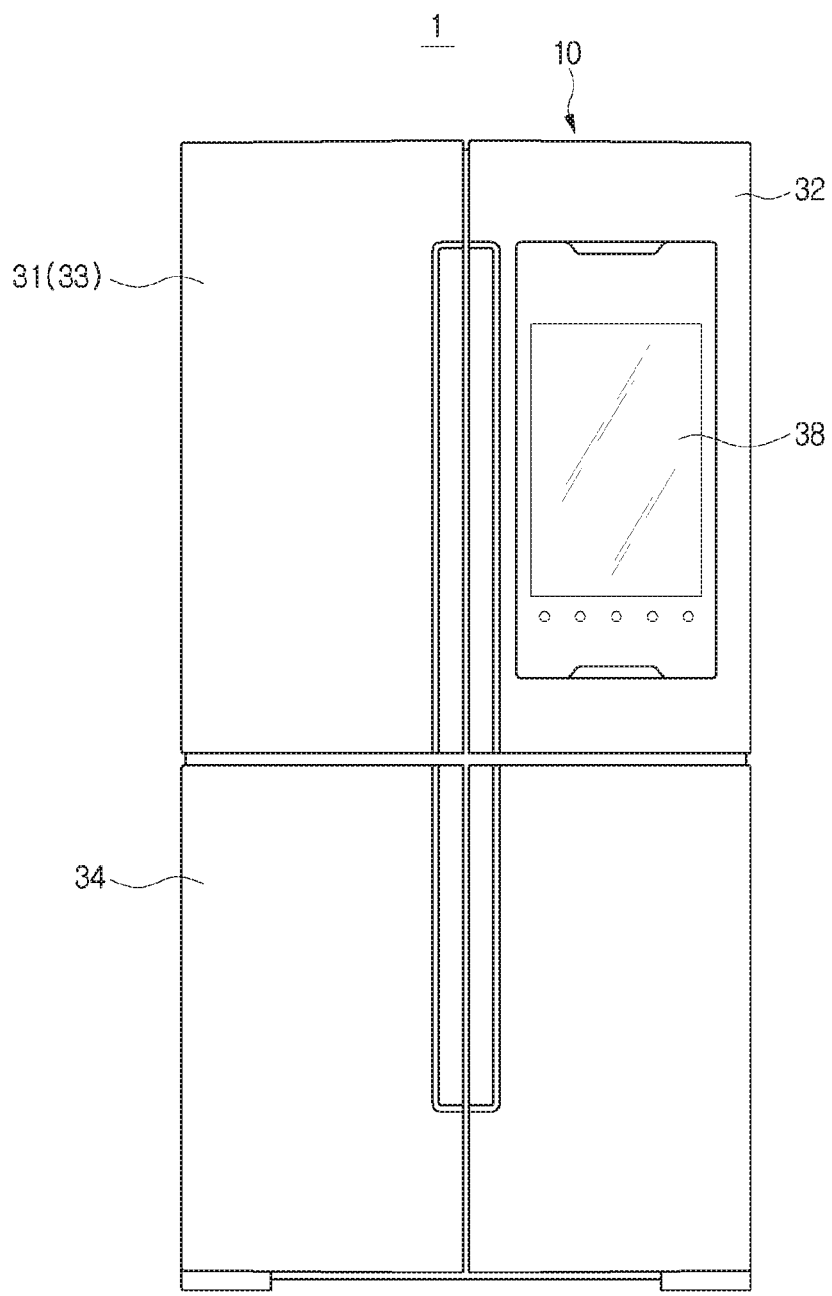

[Fig. 2]
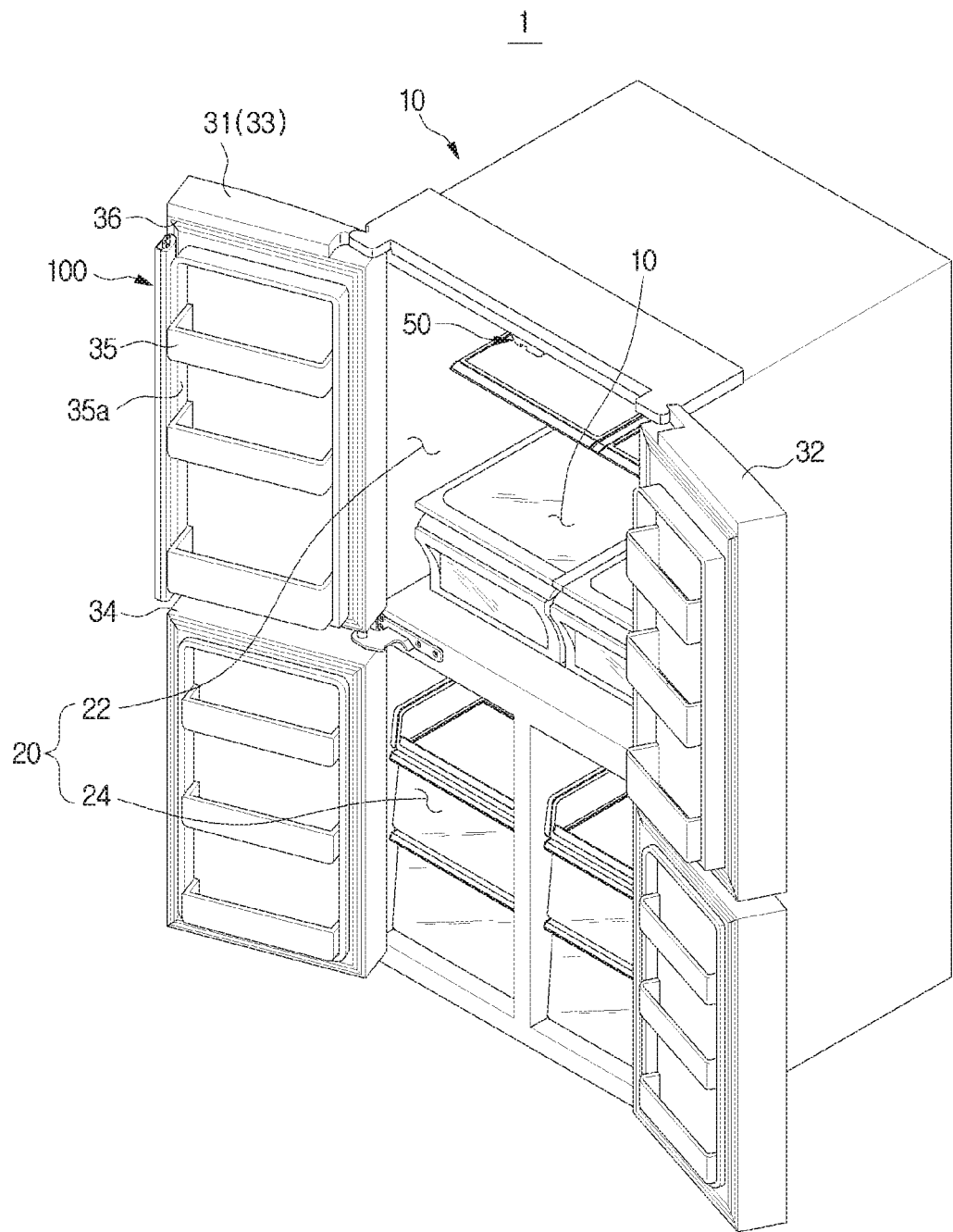

[Fig. 3]
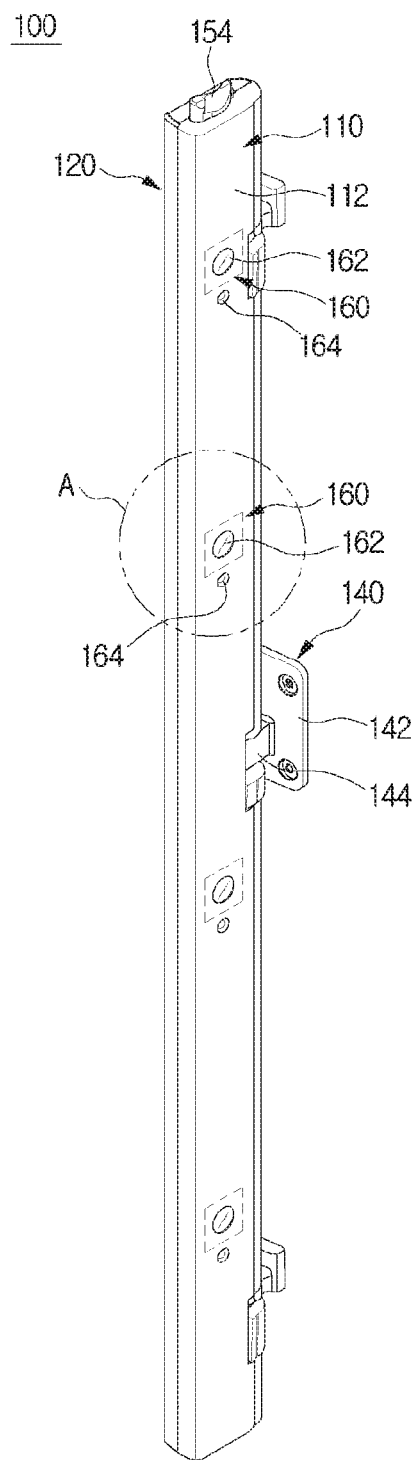

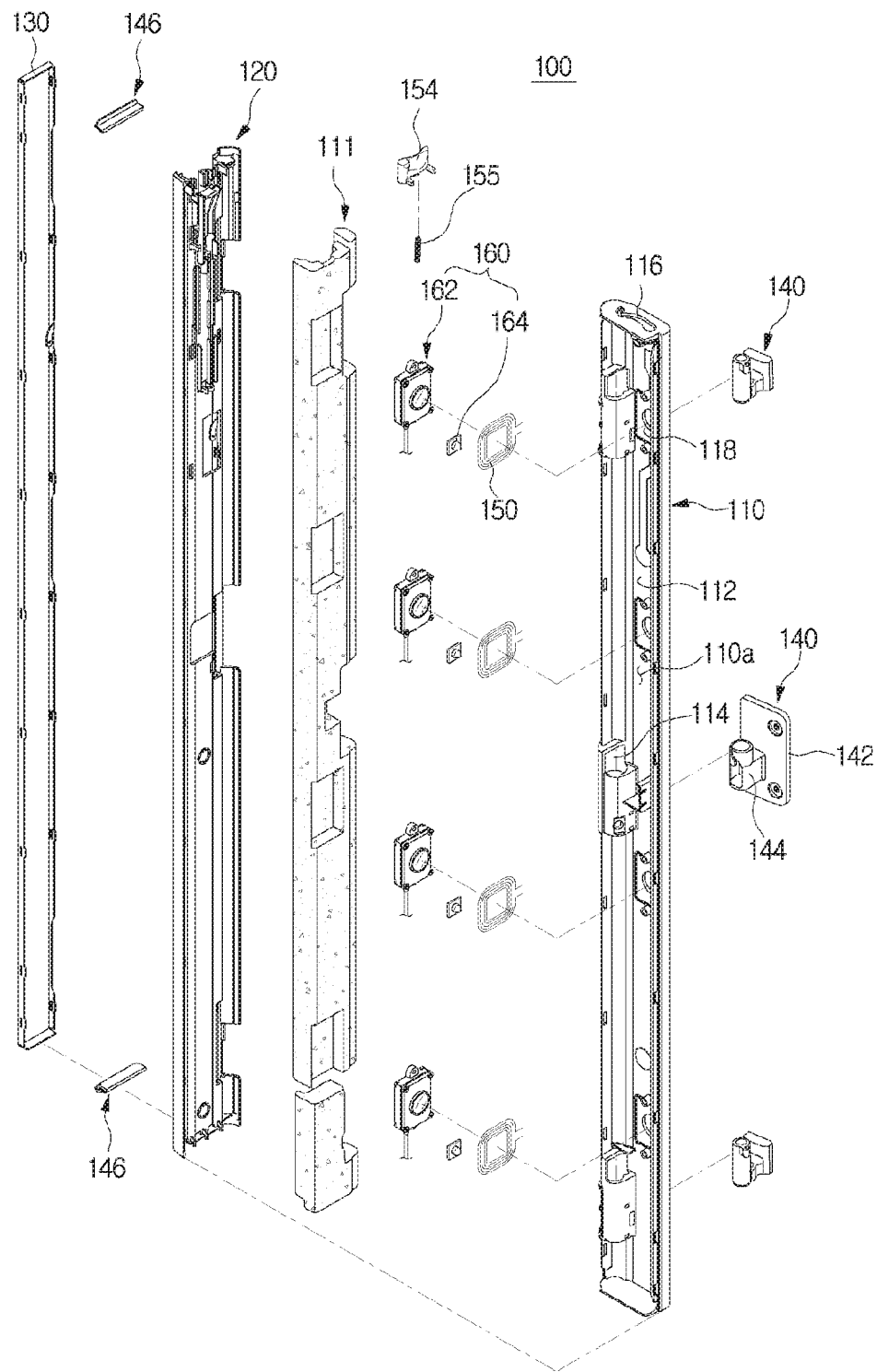
[Fig. 4]

[Fig. 5]
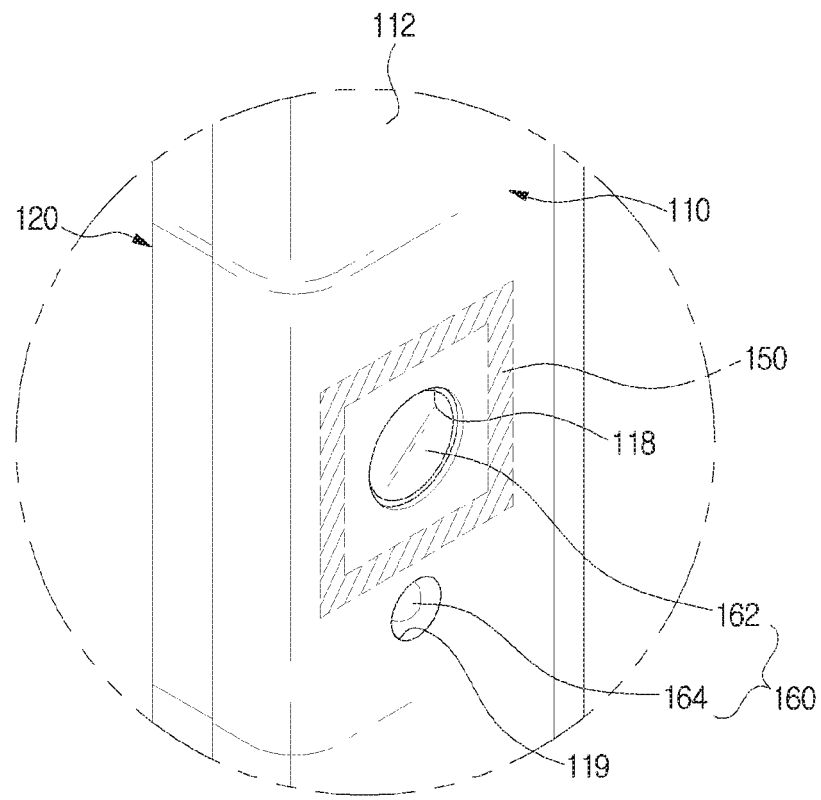
[Fig. 6]
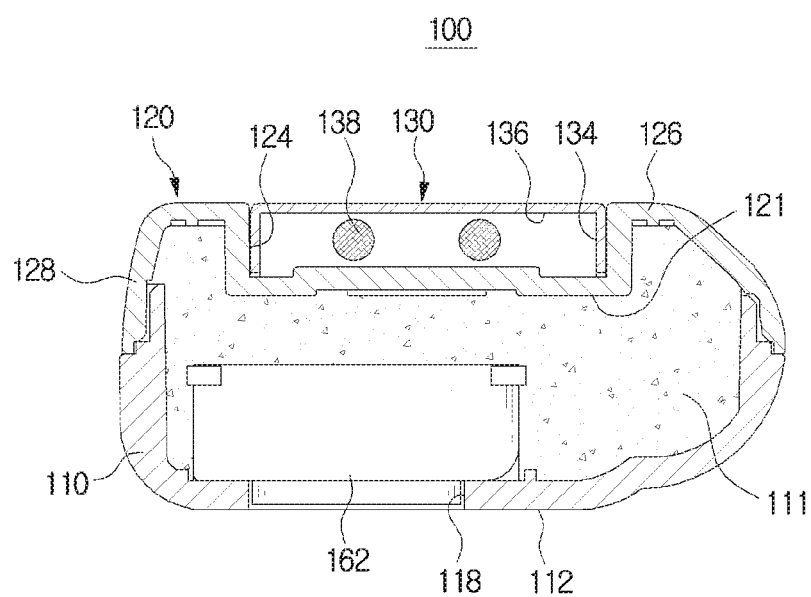

[Fig. 7]
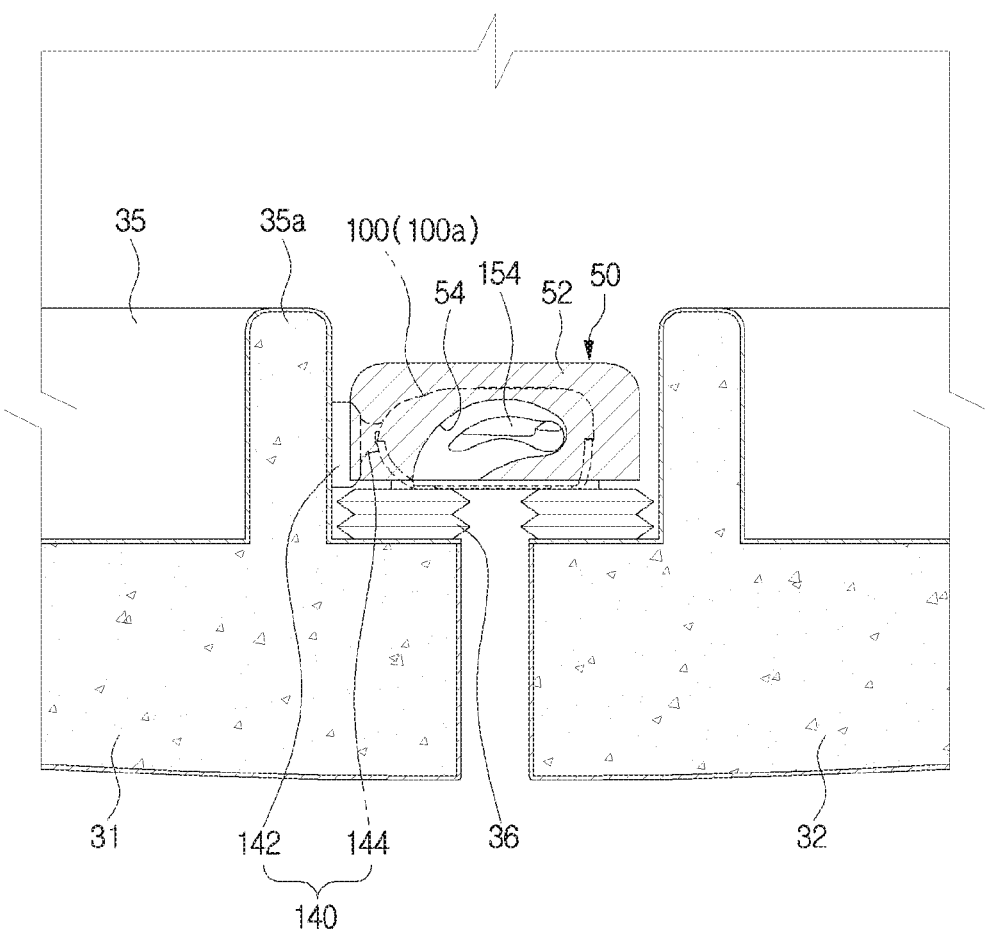

[Fig. 8]
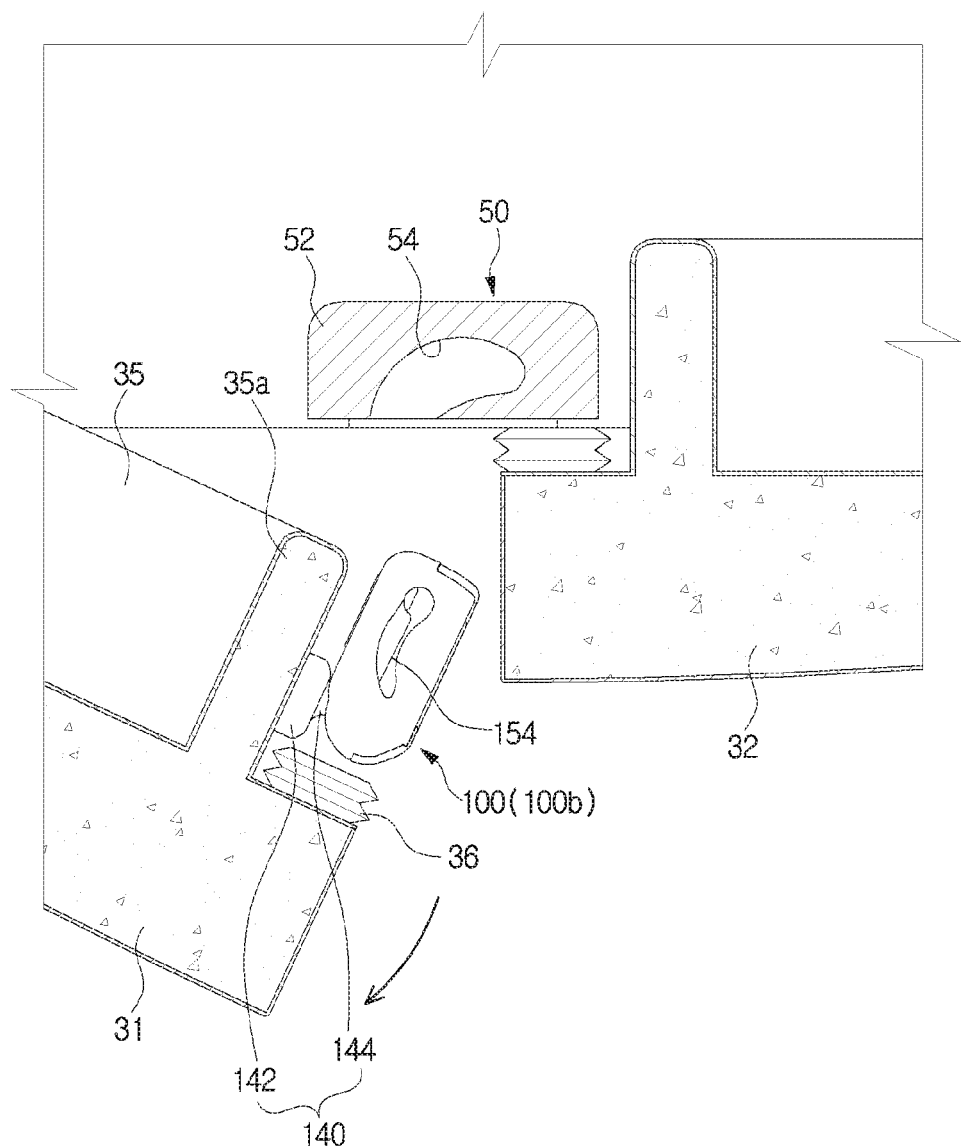

[Fig. 9]
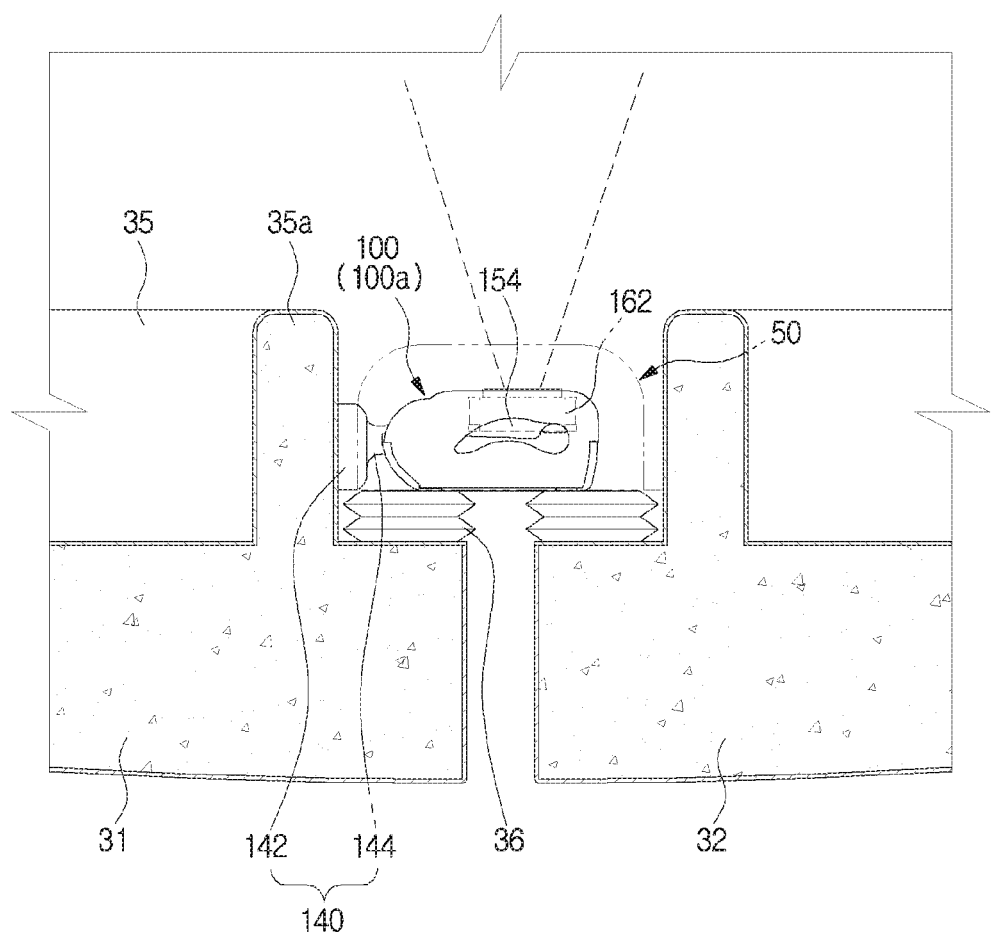

[Fig. 10]
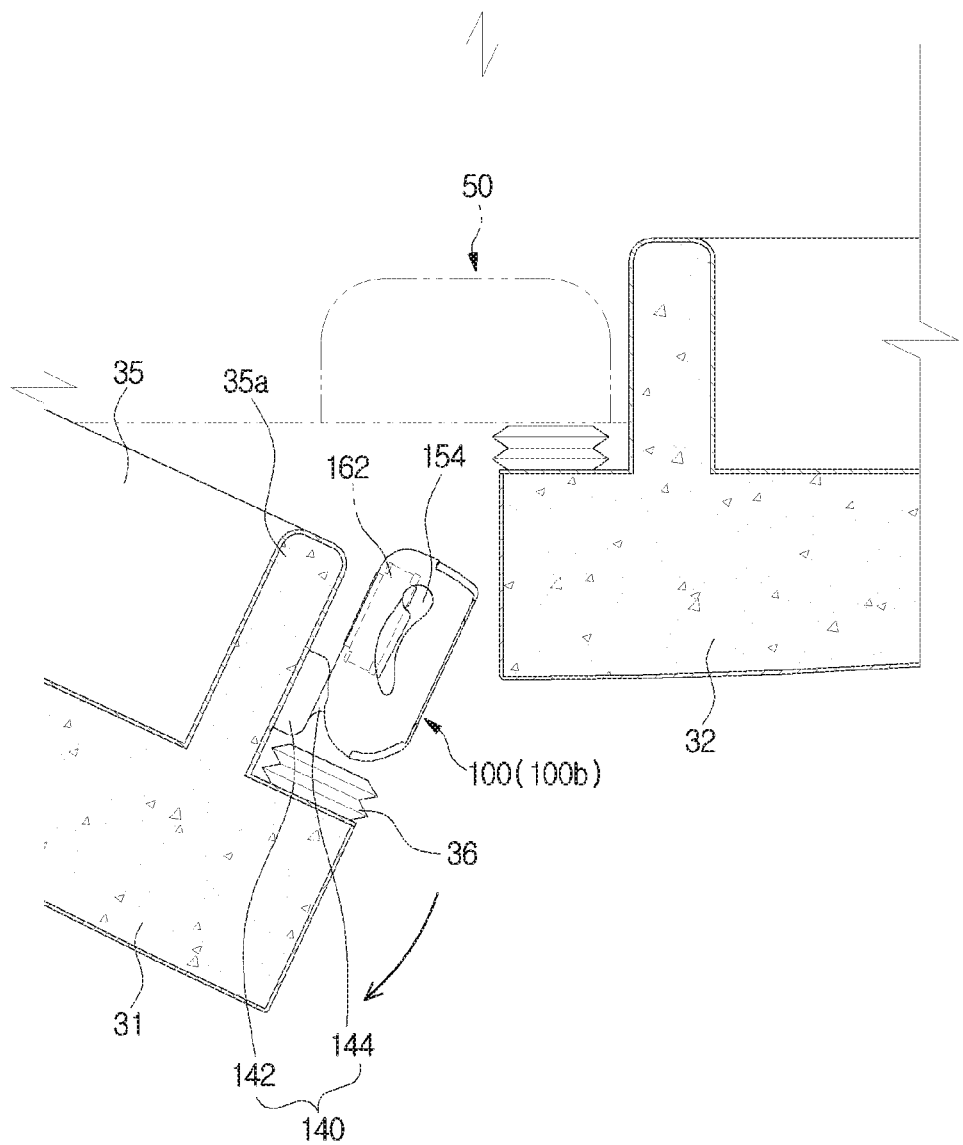

[Fig. 11]
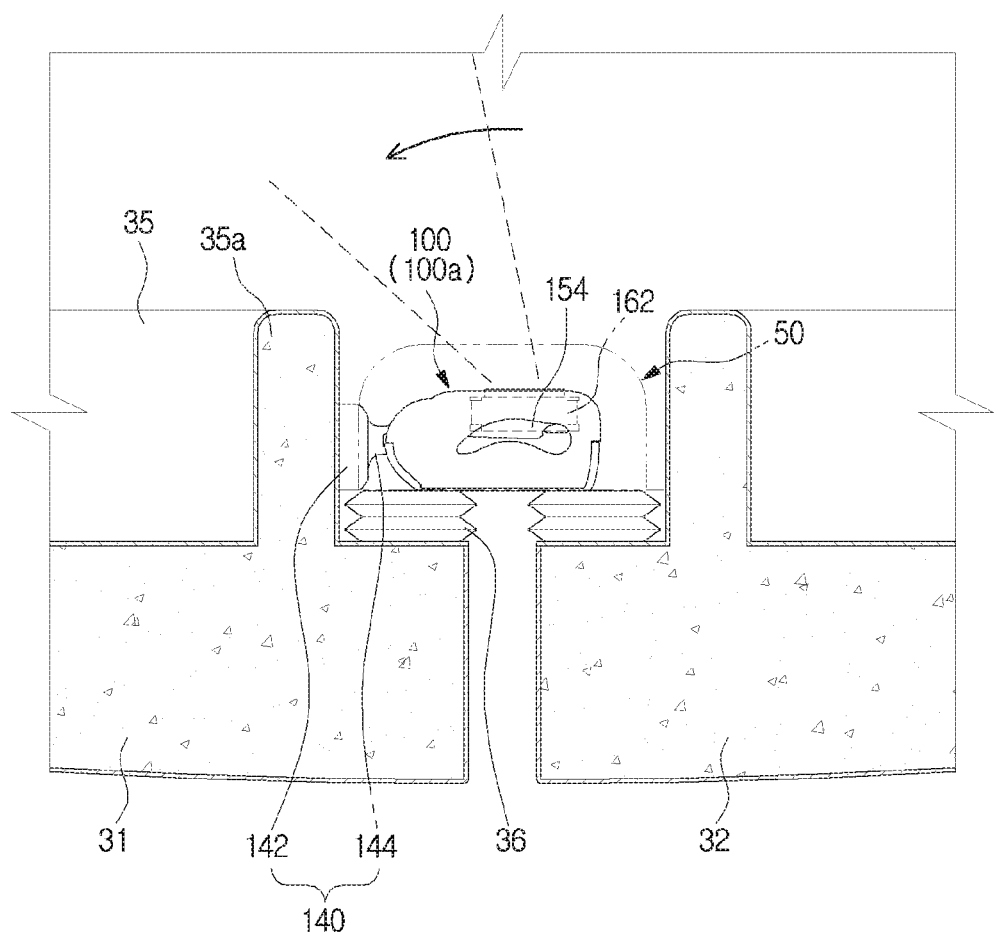

[Fig. 12]
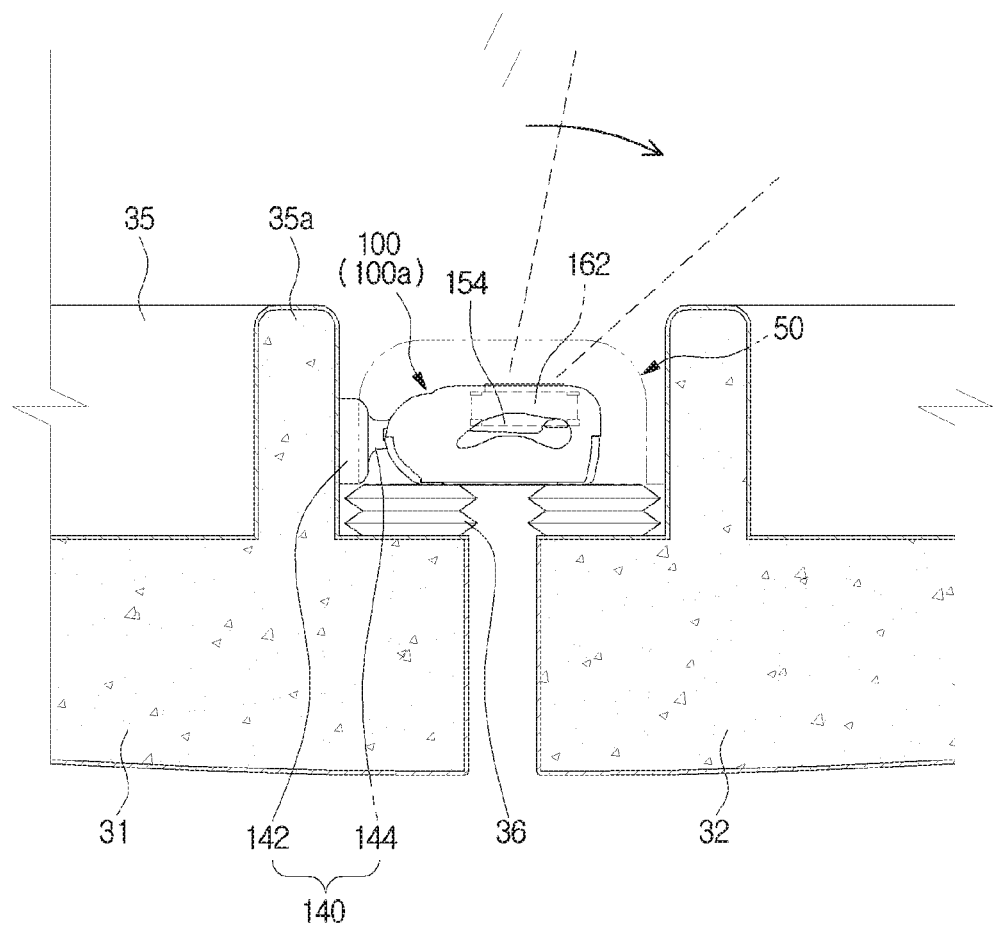

[Fig. 13]
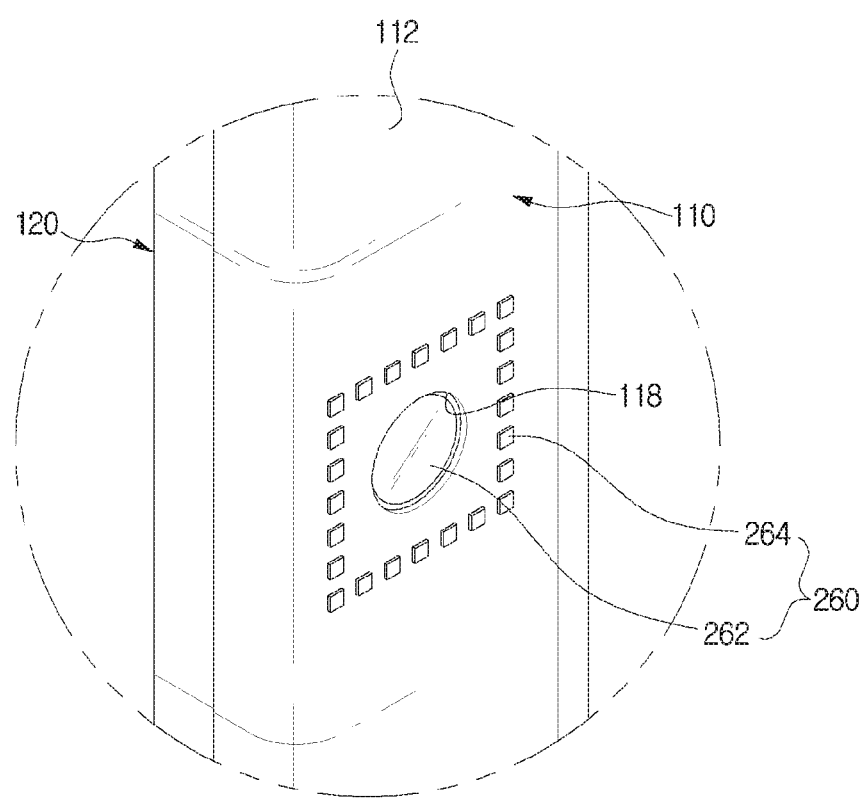

[Fig. 14]
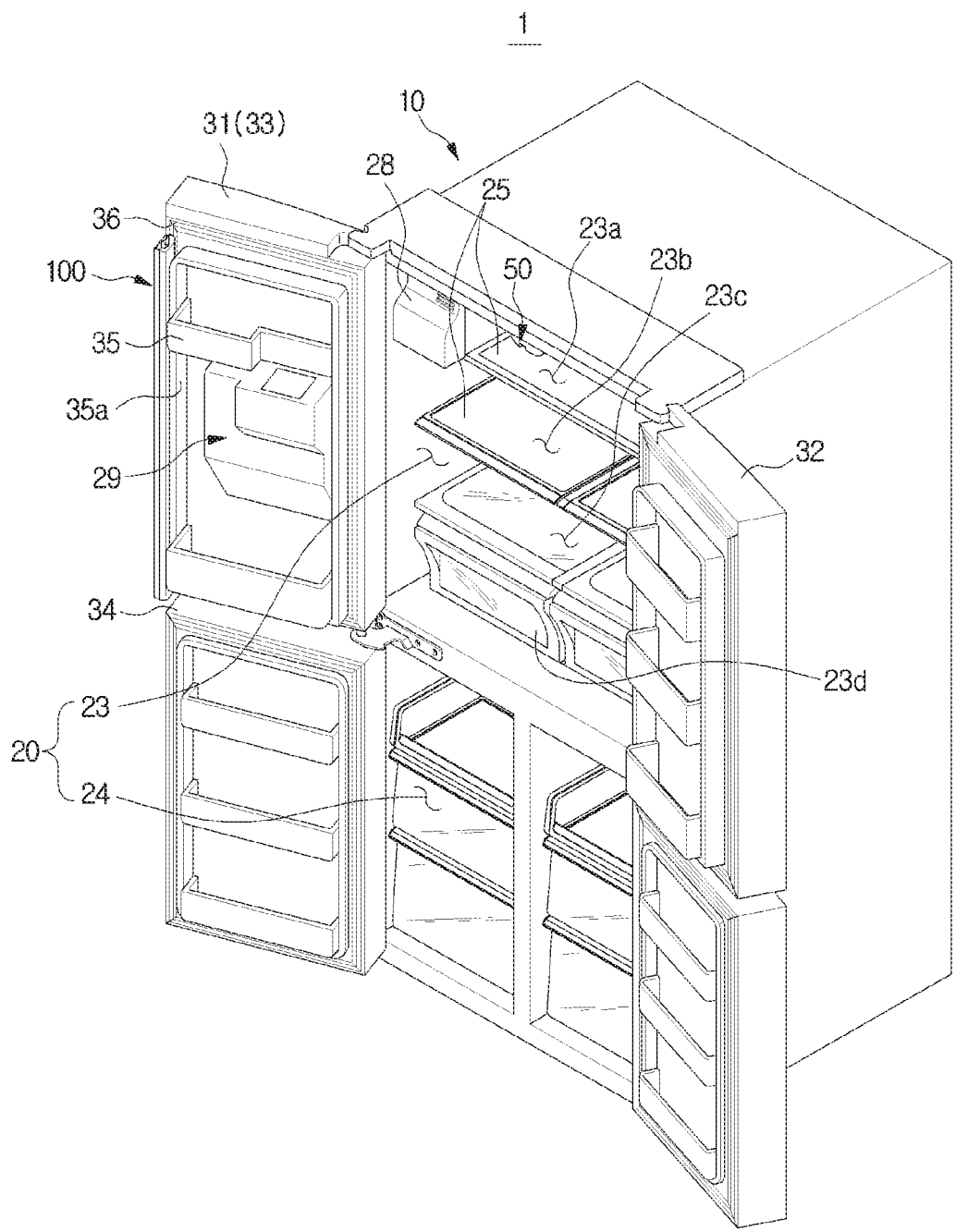

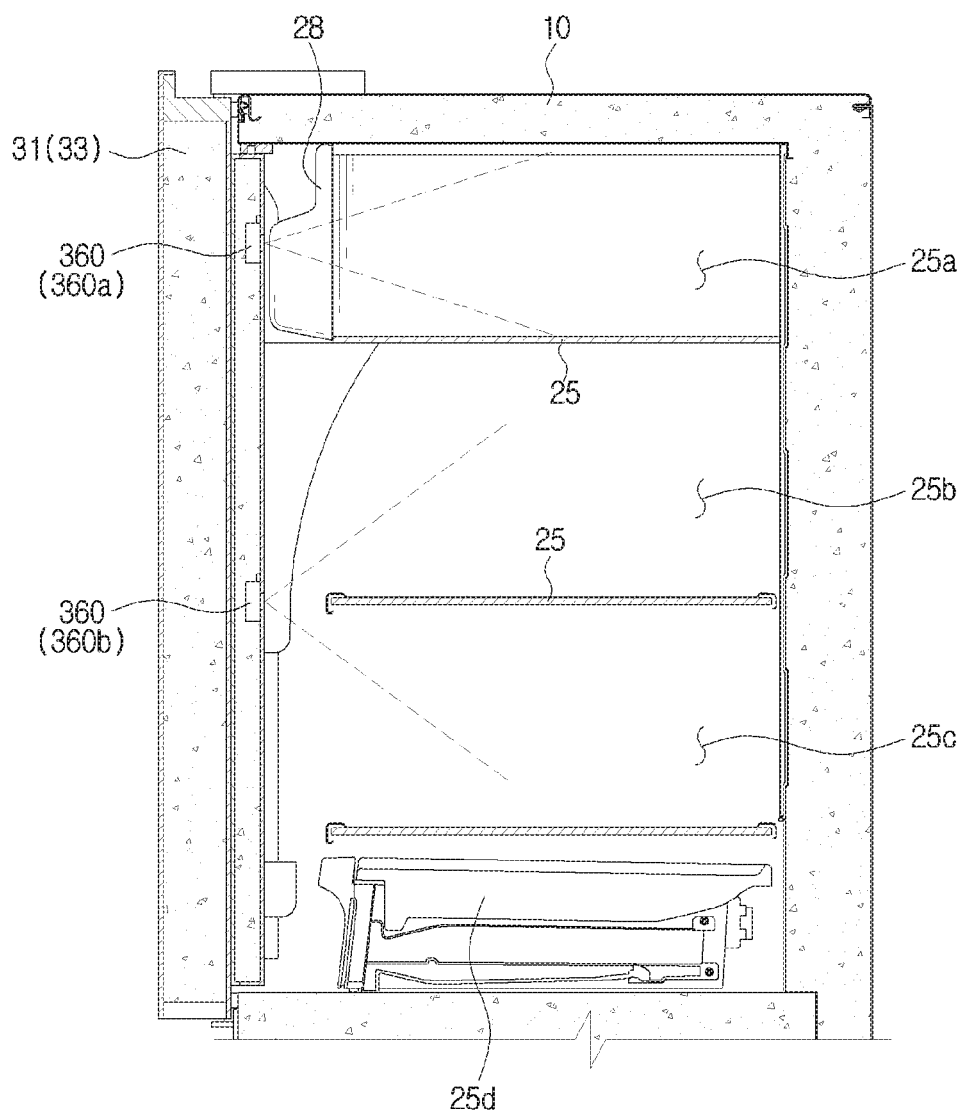
[Fig. 15]

[Fig. 16]
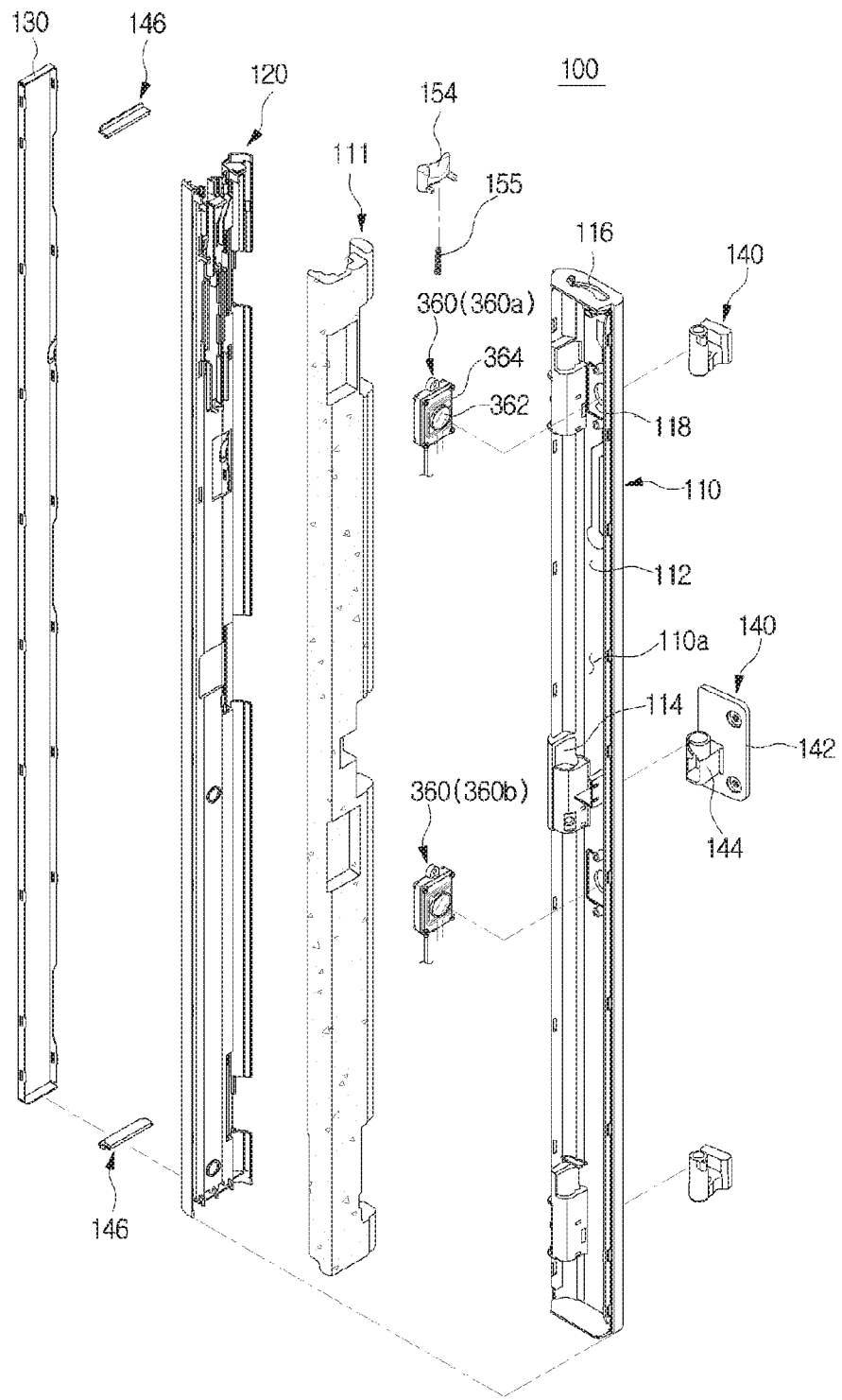

[Fig. 17]
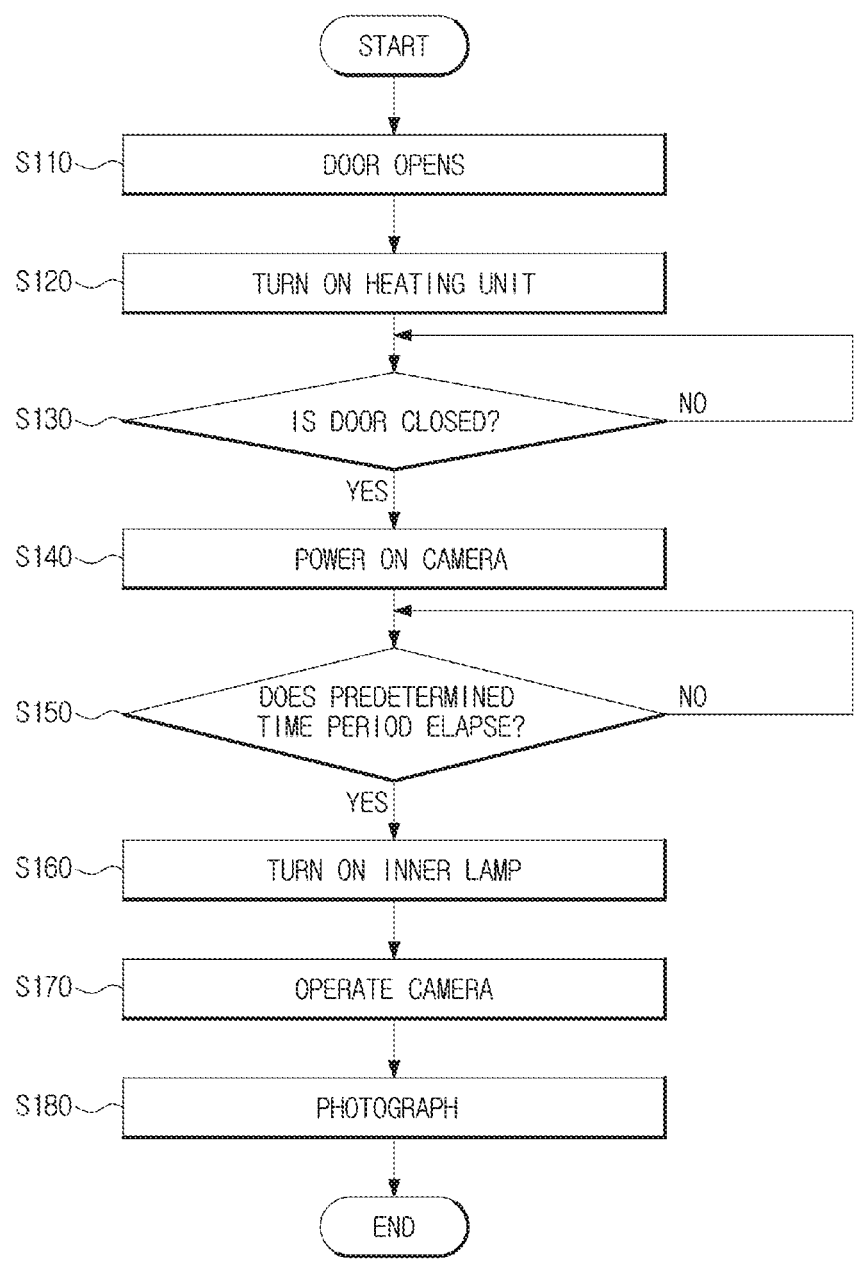

REFRIGERATOR

CROSS-REFERENCE TO RELATED APPLICATIONS

This application is a continuation application of PCT International Patent Application No. PCT/KR2016/009684, filed Aug. 31, 2016 which claims the foreign priority benefit under 35 U.S.C. § 119 of Korean Patent Application No. 10-2015-0123374, filed Sep. 1, 2015 and Korean Patent Application No. 10-2015-0187932, filed Dec. 28, 2015, the contents of which are incorporated herein by reference.

TECHNICAL FIELD

The present invention relates to a refrigerator, and more particularly, to a refrigerator including a camera unit.

BACKGROUND ART

In general, a refrigerator is a home appliance including a storage chamber for storing food, and a cool-air supply apparatus for supplying cool air to the storage chamber, to store food fresh.

Typical refrigerators could perform only a function of storing food at low temperature. However, recently, a need for additional functions, in addition to the function of storing food, is increasing.

In order for a user to check the inside of the refrigerator which is equipment for storing items, the user has to open the door of the refrigerator. Also, if the user buys food in the market or mart without knowing the amounts and kinds of food stored in the refrigerator, he/she may buy the same kinds of food as those stored in the refrigerator, or may not buy necessary food.

DISCLOSURE

Technical Problem

An aspect of the present disclosure is to provide a refrigerator including a camera unit for photographing a storage chamber.

Another aspect of the present disclosure is to provide a refrigerator including a camera unit for selectively photographing a storage chamber.

Another aspect of the present disclosure is to provide a refrigerator having a structure for protecting a camera unit for photographing a storage chamber.

Another aspect of the present disclosure is to provide a refrigerator having a speaker capable of reducing damages of failure or malfunction since it is not easily exposed to the outside.

Technical Solution

In accordance with an aspect of the present disclosure, there is provided

In accordance with a first aspect of the present invention, a refrigerator comprising: a main body having an opening, and including a storage chamber therein; a door configured to open or close the opening; a camera unit disposed in the door, and configured to photograph the storage chamber. The camera unit faces the storage chamber selectively by interworking with opening or closing of the door.

The door includes: a first door configured to open or close an area of the opening; a second door configured to open or close the remaining area of the opening; a rotation bar configured to seal a gap formed between the first door and the second door, and rotatably coupled with the first door. The camera unit is disposed in the rotation bar.

The rotation bar moves to: a closed position at which the rotation bar seals the gap formed between the first door and the second door, when the door closes the opening; and an opened position to which the rotation bar rotates from the closed position, when the door opens the opening. The camera unit faces the storage chamber when the rotation bar is at the closed position, and faces the first door when the rotation bar is at the opened position.

The first door includes a door shelf disposed in the rear surface of the first door, and configured to store a cooled object. When the rotation bar is at the closed position, the camera unit faces the door shelf.

The door shelf comprises a shelf support protruding from the first door to support the door shelf at both left and right sides. When the rotation bar is at the closed position, the camera unit faces the shelf support.

The rotation bar comprises a facing side facing the storage chamber when the rotation bar is at the closed position. The camera unit is exposed to the outside through the facing side.

The camera unit includes: a camera configured to photograph the storage chamber; and a light emitter disposed adjacent to the camera in such a way to face the storage chamber.

The camera is configured to change a photographing angle in an up, down, left, or right direction.

The camera zooms in or out a cooled object in the storage chamber to photograph the cooled object.

The camera unit further comprises a heating unit disposed along the circumference of at least one part of the camera.

The rotation bar extends vertically to correspond to a length in height direction of the first door. A plurality of camera units are disposed at intervals along the vertical direction of the rotation bar.

The refrigerator may further include a display unit disposed on a front surface of the door. Information photographed by the camera unit is output to the display unit.

Information photographed by the camera unit is output to an external communication device.

Advantageous Effects

The refrigerator according to the present disclosure includes the camera unit to enable a user to look in the storage chamber of the refrigerator without opening any door.

The refrigerator according to the present disclosure includes the camera unit to photograph the storage chamber by interworking with opening or closing of the door, thereby preventing the camera unit from operating unnecessarily.

The refrigerator according to the present disclosure enables the camera unit for photographing the storage chamber to interwork with opening or closing of the door to thus minimize exposure of the camera unit to the outside, thereby preventing failure or malfunction.

BRIEF DESCRIPTION OF THE DRAWINGS

FIG. 1 shows a refrigerator according to an embodiment of the present disclosure.

FIG. 2 is a perspective view of a refrigerator according to an embodiment of the present disclosure.

FIG. 3 is a perspective view of a rotation bar and a camera unit according to an embodiment of the present disclosure.

FIG. 4 is an exploded perspective view of a rotation bar and a camera unit according to an embodiment of the present disclosure.

FIG. 5 is an enlarged view of an area A of FIG. 3.

FIG. 6 is a cross-sectional view of a rotation bar and a camera unit according to an embodiment of the present disclosure.

FIGS. 7, 8, 9, and 10 are views for describing operations of a rotation bar and a camera unit according to opening or closing of a door, according to an embodiment of the present disclosure.

FIGS. 11 and 12 are views for describing operation of changing a photographing angle according to rotation of a camera, according to an embodiment of the present disclosure.

FIG. 13 is an enlarged view of a rotation bar and a camera unit according to another embodiment of the present disclosure.

FIG. 14 is a perspective view of a refrigerator according to another embodiment of the present disclosure.

FIG. 15 is a cross-sectional view of a refrigerator according to an embodiment of the present disclosure.

FIG. 16 is an exploded perspective view of a rotation bar and a camera unit, according to an embodiment of the present disclosure.

FIG. 17 is a flowchart illustrating a method of controlling a camera unit according to another embodiment of the present disclosure.

BEST MODE

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols used in the drawings of the present specification represent members or components performing the substantially same functions.

Also, the terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise. In this specification, it will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, embodiments of the present disclosure will be described in detail with reference to the accompanying drawings.

In general, a refrigerator is a home appliance including a storage chamber for storing food, and a cool-air supply apparatus for supplying cool air to the storage chamber, to store food fresh. The refrigerator can be classified into several types according to the locations of storage chambers and doors.

There are a Top Mounted Freezer (TMF) type refrigerator in which a storage chamber is partitioned into an upper freezing chamber and a lower refrigerating chamber by a horizontal partition wall, and a Bottom Mounted Freezer (BMF) type refrigerator having a refrigerating chamber in the upper portion and a freezing chamber in the lower portion.

Also, there are a Side By Side (SBS) type refrigerator in which a storage chamber is partitioned by a vertical partition wall into left and right sections; a freezing chamber and a refrigerating chamber, and a French Door Refrigerator (FDR) type refrigerator in which a storage chamber is partitioned by a horizontal partition wall into an upper refrigerating chamber and a lower freezing chamber, wherein the upper refrigerating chamber is opened or closed by a pair of doors.

Meanwhile, each door of the refrigerator may include a gasket to seal the gap between the door and the main body when the door closes.

In the FDR type refrigerator, since the upper refrigerating chamber is opened or closed by the pair of doors and includes no vertical partition wall, the gap formed between the pair of doors cannot be sealed by the gasket. Accordingly, in order to seal the gap formed between the doors, a method of rotatably installing a rotation bar in any one of the doors is suggested.

A refrigerator according to an embodiment of the present disclosure is, for convenience of description, assumed to be a FDR type refrigerator, although not limited to this.

FIG. 1 shows a refrigerator according to an embodiment of the present disclosure, and FIG. 2 is a perspective view of a refrigerator according to an embodiment of the present disclosure.

A refrigerator 1 may include a main body 10, a storage chamber 20 partitioned into an upper chamber and a lower chamber inside the main body 10, a door configured to open or close the storage chamber 20, and a cool-air supply apparatus (not shown) configured to supply cool air to the storage chamber 20.

The main body 10 may include an inner cabinet forming the storage chamber 20, an outer cabinet coupled with the outer side of the inner cabinet and forming the outer appearance of the refrigerator 1, and an insulator foamed between the inner cabinet and the outer cabinet, and configured to insulate the storage chamber 20.

The cool-air supply apparatus may generate cool air through a cooling circulation cycle of compressing, condensing, expanding, and evaporating refrigerants.

The front part of the storage chamber 20 may open, and the storage chamber 20 may be partitioned into an upper refrigerating chamber 22 and a lower freezing chamber 24 by a horizontal partition wall. The refrigerating chamber 22 may be opened or closed by a pair of doors 31 and 32 rotatably coupled with the main body 10, and the freezing chamber 24 may also be opened or closed by a pair of doors rotatably coupled with the main body 10. The shapes of the doors are not limited, and the doors may be sliding doors that slide to open or close.

The pair of doors 31 and 32 to open or close the refrigerating chamber 22 may be positioned from side to side. In the following description, for convenience of description, the left one of the doors 31 and 32 will be referred to as a first door 31, and the right one of the doors 31 and 31 will be referred to as a second door 32. Also, for convenience of description, the doors of the refrigerating chamber 22 will be referred to as upper doors 33, and the doors of the freezing chamber 24 will be referred to as lower doors 34.

The first door 31 may open or close the left area of the front opening 10a of the refrigerating chamber 22, and the second door 32 may open or close the remaining area of the front opening 10a of the refrigerating chamber 22. In each of the rear surfaces of the first door 31 and the second door 32, a door shelf 35 may be provided to store food therein.

The door shelf 35 may include a shelf support 35a extending vertically from the first door 31 to support the door shelf 35 at both left and right sides. The shelf support 35a may be removably connected to the doors 31 and 32. In the current embodiment, the shelf support 35a may extend from the doors 31 and 32.

Also, in the edges of the rear surfaces of the first and second doors 31 and 32, a gasket 36 may be provided to seal a gap between the first and second doors 31 and 32 and the main body 10 when the first and second doors 31 and 32 close.

The gasket 36 may be installed in the form of a loop along the edges of the rear surfaces of the first and second doors 31 and 32, and include a magnet (not shown) therein.

Meanwhile, a rotation bar 100 may be rotatably installed in the first door 31 in order to seal a gap made between the first and second doors 31 and 32 when the first and second doors 31 and 32 close. In the current embodiment, the rotation bar 100 is rotatably installed in the first door 31, however, the rotation bar 100 may be installed in the second door 32.

The rotation bar 100 may be in the shape of a bar extending in the height direction of the first door 31, and may be rotated by a guide member 50 installed in the main body 10. The guide member 50 of the main body 10 may include a guide body 52 coupled with the main body 52, and a guide groove 54 formed in the guide body 52.

FIG. 3 is a perspective view of a rotation bar and a camera unit according to an embodiment of the present disclosure, FIG. 4 is an exploded perspective view of a rotation bar and a camera unit according to an embodiment of the present disclosure, FIG. 5 is an enlarged view of an area A of FIG. 3, and FIG. 6 is a cross-sectional view of a rotation bar and a camera unit according to an embodiment of the present disclosure.

The rotation bar 100 may include a case 110 having accommodating space 110a therein and having an opening in one side, a cover 120 coupled with the case 110 to close the opening of the case 110, and a metal plate 130 coupled with the outer surface of the cover 120.

The case 110, which forms the outer appearance of the rotation bar 100, may form the accommodating space 110a therein and have the opening in one side, wherein the opening may be covered by the cover 120. The case 110 may include a hinge bracket coupling portion 114 that is coupled with a hinge bracket 140. Also, the case 110 may include a facing side 112 formed along the longitudinal direction of the case 10 to face the storage chamber 20. The facing side 112 may be configured to expose a camera unit 160 which will be described later.

Although not shown in the current embodiment, the rotation bar 100 may further include an insulating member 111. The insulating member 111 may be disposed in the accommodating space 110a of the case 110. The insulating member 111 may be used to insulate the refrigerating chamber 22, and may be formed of an arbitrary material. For example, the insulating member 111 may be made of Expanded PolyStyrene (EPS) having excellent insulating performance and lightweight.

The hinge bracket 140 may include a fixing portion 142 fixed on the rear surface of the first door 31, and a hinge bar 144 connecting the fixing portion 142 to the rotation bar 100 such that the rotation bar 100 can rotate with respect to a rotation axis. The fixing portion 142 may be coupled with the rear surface of the first door 31 by a coupling member such as a screw or the like.

In the top of the case 110, a through hole 116 may be formed such that an insertion protrusion 154 to be inserted into the guide groove of the guide member 50 can protrude the outside of the case 110. The through hole 116 may be a hole having the same shape as the insertion protrusion 154. The insertion protrusion 154 may be elastically supported by an elastic member 155, so as to elastically pass through the through hole 116 according to the position of the rotation bar 100.

In the current embodiment, the guide member 50 is formed in the upper portion of the main body 10, and the insertion protrusion 154 protrudes upward from the rotation bar 100. However, the guide member 50 may be formed in the lower portion of the main body 10, and the insertion protrusion 154 may protrude downward from the rotation bar 100. Accordingly, the through hole 116 of the case 110 may also be formed in the bottom of the case 110. The case 110 may be injection-molded with a plastic material. However, the case 110 may be formed of any other material.

The cover 120 may cover the opening of the case 110. More specifically, the insulating member 111 may be inserted into the accommodating space 110a of the case 110, and then the cover 120 may be coupled with the opening of the case 110.

The cover 120 may have a section of a shape cut several times, and form a part of the sides of the rotation bar 100 and a part of the rear surface of the rotation bar 100. Herein, the rear surface of the rotation bar 100 may face the gasket 36 of the door.

More specifically, the cover 120 may include an insulating member contacting portion 121 contacting the insulation member 111, a first coupling portion 124 coupled with the metal plate 130 which will be described later, a heat conduction preventing portion 126 aligned with the metal plate 130 and configured to prevent heat conduction to the rotation bar 100, and a side forming portion 128 forming at least one part of the sides of the rotation bar 100. The cover 120 may be injection-molded with a plastic material having low heat conductivity.

The metal plate 130 may be coupled with the cover 120, wherein the metal plate 130 may be formed of a metal material to tightly contact the gasket 36 by the magnetism of the magnet included in the gasket 36 and to provide stiffness to the rotation bar 100.

The metal plate 130 may include a second coupling portion 134 coupled with the first coupling portion 124 of the cover 120, and a gasket contacting portion 136 tightly contacting the gasket 36. The second coupling portion 134 of the metal plate 130 may be coupled with the first coupling portion 124 of the cover 120 by an adhesive member or a coupling member such as a screw.

In space formed by the second coupling portion 134 of the metal plate 130 and the gasket contacting portion 136 of the metal plate 130, a heating member 138 for dissipating heat may be disposed to prevent frost from being formed on the metal plate 130 due to a difference in temperature between the inside temperature and the outside temperature of the refrigerating chamber 22.

In order to prevent heat generated by the heating member 138 from being excessively transferred to the metal plate 130, the heating member 138 may be preferably embodied as a heating cable manufactured by covering a heating wire with an insulting material such as silicon or FEP.

The heating member 138 may contact the metal plate 130 through line contact, instead of surface contact, to transfer only a minimum amount of heat capable of preventing frost formation on the metal plate 130 to the metal plate 130.

Meanwhile, the heat conductance preventing portion 126 of the cover 120 and the gasket contacting portion 136 of the metal plate 130 may form the rear surface of the rotation bar 100 together. More specifically, the gasket contacting portion 136 of the metal plate 130 may form the center of the rear surface of the rotation bar 100, and the heat conductance preventing portion 126 of the cover 120 may form both edges of the rear surface of the rotation bar 100.

Through the above-described configuration, if the first and second doors 31 and 32 close, the rotation bar 100 may tightly contact the gasket 36 of the first and second doors 31 and 32 to seal the gap between the first and second doors 31 and 32, while minimizing the penetration of heat generated by the heating member 138 of the rotation bar 100 into the inside of the refrigerating chamber 22.

Accordingly, the insulation property of the rotation bar 100 can be improved, and also the heat loss of the heating member 138 can be minimized, thereby reducing energy for preventing frost formation on the rotation bar 100.

Meanwhile, in the upper and lower ends of the rotation bar 100, sealing members 146 may be provided to seal gaps formed between the rotation bar 100 and the main body 10 when the doors 31 and 32 close.

The upper sealing member 146 and the lower sealing member 146 may respectively seal the gap formed between the guide member 50 of the main body 10 and the rotation bar 100 when the doors 31 and 32 close. If the guide member 50 is provided in the upper portion of the main body 10, the sealing member 146 may seal the gap formed between the guide member 50 and the rotation bar 100.

The sealing member 146 may be formed of a flexible material such as rubber to gently seal the gap between the main body 10 and the rotation bar 100 without any damage by collision.

The refrigerator 1 may include the camera unit 160. The camera unit 160 may enable a user to look the inside of the storage chamber 20 from the outside, without opening any door. Information obtained by photographing the inside of the storage chamber 20 through the camera unit 160 may be transferred to a display unit 38 or an external communication device (not shown).

The camera unit 160 may be disposed in the door to photograph the inside of the storage chamber 20, and transfer information acquired by photographing the inside of the storage chamber 20 to the display unit 38 located in the outer side of the refrigerator 1 or to the external communication device located outside the refrigerator 1. The user can check the information through the display unit 38 or through the external communication device.

The camera unit 160 may be disposed in the rotation bar 100. More specifically, the camera unit 160 may be exposed through the facing side 112 of the rotation bar 100. The rotation bar 100 may rotate by interworking with opening or closing of the doors 31 and 32, and accordingly, the facing side 112 of the rotation bar 100 may also face the storage chamber 20 by interworking with opening or closing of the doors 31 and 32. Also, the camera unit 160 exposed through the facing side 112 may also face the storage chamber 20 selectively by interworking with opening or closing of the doors 31 and 32. More specifically, since the rotation bar 100 is rotatable with respect to the first door 31, the camera unit 160 may face the storage chamber 20 selectively by interworking with opening or closing of the first door 31.

Since the rotation bar 100 is in the shape of a bar extending along the height direction of the first door 31, a plurality of camera units 160 may be disposed at regular intervals vertically along the height direction of the first door 31. However, a single camera unit 160 may be disposed in the rotation bar 100 to photograph the storage chamber 20.

The camera unit 160 may include a camera 162 and a light emitter 164.

The camera 162 may be configured to photograph the storage chamber 20. The camera 162 may be exposed to the outside of the rotation bar 100 through a first through hole 118 formed in the facing side 112. In order to prevent moisture from entering between the camera 162 and the first through hole 118, a sealing member (not shown) may be disposed between the camera 162 and the through hole 118. The camera 162 may change a facing direction to a up, down, left, or right direction within a predetermined angle range, as shown in FIGS. 11 and 12, and may zoom in or out a specific cooled object and then photograph the object.

The light emitter 164 may be disposed adjacent to the camera 162 to irradiate light to an area to be photographed by the camera 162 so that a bright image can be acquired. The light emitter 164 may be exposed to the outside of the rotation bar 100 through a second through hole 119 formed in the facing side 112. The light emitter 164 may be installed in the rotation bar 100 together with the camera 162, and exposed to the outside through the facing side 112. Although the number and arrangement of the light emitter 164 are not limited, in the current embodiment, a single light emitter 164 may be disposed below the camera 162. However, the present disclosure is not limited to this, as long as at least one light emitter 164 is disposed around the camera 162. The light emitter 164 may be a Light Emitting Diode (LED).

The camera unit 160 may include a data transmitter (not shown). The data transmitter may be electrically connected to the camera 162, and transmit images photographed by the camera 162 to the display unit 38 of the refrigerator 1 or the external communication device outside the refrigerator 1. The data transmitter may be directly connected to a controller (not shown) through a wire, or may include a separate wireless device to transmit image information in a wireless fashion.

Referring to FIG. 5, the camera unit 160 may include a heating unit 150. The heating unit 150 may be disposed along at least one part of the camera 162 to heat the camera 162. The heating unit 150 may be positioned adjacent to the camera 162 to prevent frost formation on the camera 162. If the rotation bar 100 is at a closed position 100a, the rotation bar 100 may be exposed to cool air in the storage chamber 20. If the doors 31 and 32 open after the rotation bar 100 is exposed to cool air for a long time, the camera unit 160 installed in the rotation bar 100 may contact relatively warm air of the outside so that frost may be formed on the camera unit 160. The heating unit 150 may transfer heat to the camera unit 160 in order to prevent frost formation on the camera unit 160.

The heating unit 150 may be embodied as various embodiments. For example, in the current embodiment, the heating unit 150 may be a hot wire formed along the circumference of the camera unit 160. The heating unit 150 may be installed in the case 110 of the rotation bar 100 in such a way to be adjacent to the camera 162. The heating unit 150 may be disposed along the circumference of the camera 162 to transfer heat to the camera 162, thereby preventing frost formation on the camera 162.

Hereinafter, operations of the refrigerator 1 according to an embodiment of the present disclosure will be described.

FIGS. 7, 8, 9, and 10 are views for describing operations of a rotation bar and a camera unit according to opening or closing of a door, according to an embodiment of the present disclosure, and FIGS. 11 and 12 are views for describing operation of changing a photographing angle according to rotation of a camera, according to an embodiment of the present disclosure.

The rotation bar 100 may be rotatably mounted on the first door 31. More specifically, the rotation bar 100 may be mounted on the first door 31 in such a way to be rotatable between the closed position 100a and an opened position 100b. The closed position 100a of the rotation bar 100 may be a position at which the rotation bar 100 seals the gap between the first and second doors 31 and 32 when the first and second doors 31 and 32 close the opening 10a. The opened position 100b of the rotation bar 100 may be a position to which the rotation bar 100 rotates from the closed position 100a. When the rotation bar 100 is at the opened position 100b, the rotation bar 100 may be positioned vertically to the first door 31 so that the rotation bar 100 does not interfere with the second door 32. When the rotation bar 100 is at the closed position 100a, the camera 162 may face the storage chamber 20, and when the rotation bar 100 is at the opened position 100b, the camera 162 may face the first door 31. In the rear surface of the first door 31, the door shelf 35 may be disposed to store cooled objects. When the rotation bar 100 is at the opened position 100b, the camera 162 may face the door shelf 35 of the first door 31. More specifically, when the rotation bar 100 is at the opened position 100b, the camera 162 may face the shelf support 35a.

Through the operation, when the rotation bar 100 is at the closed position 100a, the camera 162 may photograph the storage chamber 20 so as to enable a user to check the inside of the storage chamber 20 without opening any door. Also, when the user opens the first door 31, the rotation bar 100 may move to the opened position 100b so that the camera 162 faces the shelf support 35a protruding from the first door 31, thereby minimizing exposure to the outside. Thereby, it is possible to prevent malfunction or damage of the camera 162 by external influence.

The camera 162 may be configured to operate only when the rotation bar 100 is at the closed position 100a. Also, the camera 162 may rotate in the up, down, left, or right direction within the predetermined angle range, as described above, when the rotation bar 100 is at the closed position 100a, thereby changing an area to be photographed. Also, the camera 162 may zoom in or out to magnify and photograph a cooled object or to photograph a plurality of cooled objects together.

The controller (not shown) may determine whether the rotation bar 100 is at the closed position 100a or at the opened position 100b, so that the camera 162 can photograph the storage chamber 20 only when the rotation bar 100 is at the closed position 100a.

Hereinafter, a refrigerator 1 according to another embodiment of the present disclosure will be described. Hereinafter, descriptions for the same components as those described above will be omitted.

FIG. 13 is an enlarged view of a rotation bar and a camera unit according to another embodiment of the present disclosure.

A camera unit 260 may include a camera 262 and a plurality of light emitters 264.

The plurality of light emitters 264 may be arranged at intervals along the circumference of the camera 262. The plurality of light emitters 264 may irradiate light to an area to be photographed by the camera 262 so that a bright image can be acquired. The plurality of light emitters 262 may be a plurality of LEDs.

Also, the plurality of light emitters 264 may prevent frost formation on the camera 272 using heat generated by irradiated light. That is, the plurality of light emitters 264 may also function as heat sources to remove frost from the camera 262. Although the number and arrangement of the plurality of light emitters 264 are not limited, the plurality of light emitters 262 may be arranged at regular intervals along the circumference of the camera 262 in order to provide uniform heat to the camera 262.

Hereinafter, a refrigerator according to another embodiment of the present disclosure will be described. Hereinafter, descriptions for the same components as those described above will be omitted.

FIG. 14 is a perspective view of a refrigerator according to another embodiment of the present disclosure, FIG. 15 is a cross-sectional view of a refrigerator according to an embodiment of the present disclosure, and FIG. 16 is an exploded perspective view of a rotation bar and a camera unit, according to an embodiment of the present disclosure.

A refrigerating chamber 23 may be partitioned by at least one shelf 25. Also, the refrigerating chamber 23 may further include a refrigerating box 23d formed in a drawer type. In the current embodiment, the refrigerating chamber 23 may include a pair of shelves 25 and a single refrigerating box 23d. The refrigerating chamber 23 may be partitioned into first to third refrigerating spaces 23a, 23b, and 23c by the pair of shelves 25. In the first refrigerating space 23a, an ice making unit 28 may be provided. Ice pieces made by the ice making unit 28 may be discharged to the front part of the door 31 through a dispenser assembly 29.

A camera unit 360 may include a camera 362 and a heating unit 364. The camera 362 may be configured to photograph the refrigerating chamber 23.

The camera 362 and the heating unit 364 may be integrated into a single module. If the camera 362 and the heating unit 364 are integrated into a single module, the heating unit 364 may apply heat to the camera 362 to prevent frost formation on the camera 362. The heating unit 364 may be powered on/off together when the camera 362 is powered on/off, or may be powered on/off through a separate power source from the camera 362.

A plurality of camera units 360 may be arranged at intervals, vertically along the height direction of the first door 31. In the current embodiment, a pair of camera units 360 may be provided. The arrangement of the camera units 360 is not limited. In the current embodiment, a first camera unit 360a may be disposed to photograph the first refrigerating space 23a, and a second camera unit 360b may be disposed to photograph the second and third refrigerating spaces 23b and 23c.

Hereinafter, a method of controlling the camera unit 360 according to the above-described configuration will be described.

FIG. 17 is a flowchart illustrating a method of controlling a camera unit according to another embodiment of the present disclosure.

If the door 31 or 32 opens, in operation S110, the heating unit 364 may operate, in operation S120. The heating unit 364 may prevent frost formation on the camera 362.

If the door 31 or 32 opens to open the refrigerating chamber 23, and then the door 31 or 32 closes to close the refrigerating chamber 23 ("YES" in operation S130), the camera 362 may be powered on, in operation S140. While the refrigerating chamber 23 opens ("NO" in operation S130), the camera 362 may be maintained at a power-off state until the door 31 or 32 closes.

After the camera 362 is powered on, the camera 362 may be maintained at the power-on state for a predetermined time period, in operation S150. The predetermined time period may be a time period for which the heating unit 364 applies sufficient heat to the camera 362 so that no frost is formed on the camera 362. The predetermined time period may be about 150 seconds.

After the predetermined time period elapses, an inner lamp in the refrigerating chamber 23 may be turned on, in operation S160. The inner lamp may irradiate light to the inside of the refrigerating chamber 23 so that the camera 362 can photograph the inside of the refrigerating chamber 23. The number and arrangement of the inner lamp are not limited.

After the inner lamp is turned on, the camera 362 may become a state in which it can photograph the inside of the refrigerating chamber 23, in operation S170. That is, the camera 362 may become a state in which it can photograph the inside of the refrigerating chamber 23, according to the illuminance of the inside of the refrigerating chamber 23 changing if the inner lamp is turned on.

After the camera 362 operates, the camera 362 may photograph the inside of the refrigerating chamber 23, in operation S180.

An image photographed by the camera 362 may be stored in a system storage unit (not shown) of the refrigerator 1. Also, the image may be transferred to the display unit 38 or the external communication device (not shown) so that the user can see the image. The image may be stored together with previously photographed images so that the user can compare the currently photographed image to the previously photographed images.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A refrigerator comprising:
a main body having a storage room;
a first door and a second door configured to open or close the storage room; and
a rotation bar rotatably coupled with the first door, the rotation bar being configured to cover a gap between the first door and the second door,
wherein the rotation bar comprises:
a case formed with an accommodating space and a hole through a side of the case,
a camera assembly installed to the case, the camera assembly including a front side facing the hole, and
an insulating member formed to be disposed in the accommodating space of the case and having a groove arranged so that the camera assembly installed in the case is seated in the groove of the insulating member to have the insulating member surround exterior sides of the camera assembly except the front side such that the front side of the camera assembly is uncovered by the insulating member, and
wherein the camera assembly includes:
a camera configured to photograph the storage room through the hole of the case while the camera is facing the storage room, and
a heating device configured to generate heat to be transferred to the front side of the camera assembly,
wherein the rotation bar rotates such that the front side of the camera assembly faces the storage room as the first door closes, and the rotation bar rotates such that the front side of the camera assembly faces away from the storage room as the first door opens.

2. The refrigerator according to claim 1, wherein the first door comprises a door shelf formed on a rear surface of the first door, the door shelf being configured to accommodate an object that is to be cooled, and
the rotation bar is configured to be rotatable between a first position in which the camera assembly faces toward the storage room and a second position in which the camera assembly faces toward the door shelf.

3. The refrigerator according to claim 2, wherein the door shelf comprises a shelf support protruding from the rear surface of the first door, the shelf support being configured to support ends of the door shelf, and
the camera assembly faces away from the storage room and toward the shelf support when the rotation bar is at the second position.

4. The refrigerator according to claim 1, wherein the rotation bar comprises:
a cover disposed on one side of the case to cover the one side of the case, and
the insulating member is disposed between the case and the cover, and the insulating member is configured to accommodate the camera assembly at a position of the hole.

5. The refrigerator according to claim 1, wherein the camera assembly is a first camera assembly, the hole is a first hole and the groove is a first groove, and
the refrigerator further comprises a plurality of hinge brackets provided in the first door such that the rotation bar is rotatable with respect to the first door,
wherein the rotation bar further comprises a second camera assembly and the first camera assembly is spaced apart from the second camera assembly,
wherein the case further includes a second hole and the first hole and the second hole respectively correspond to the first camera assembly and the second camera assembly,
wherein the insulating member further includes a second groove, and the first groove and the second groove respectively correspond to the first camera assembly and the second camera assembly.

6. The refrigerator according to claim 1, wherein the camera and the heating device are integrated into a single module.

7. The refrigerator according to claim 6, wherein the camera is configured to change a photographing angle to face upward, downward, leftward, or rightward.

8. The refrigerator according to claim 1, wherein the rotation bar extends vertically to correspond to a vertical length of the first door,
wherein the camera assembly is a first camera assembly, and the rotation bar further comprises a second camera assembly, and the first camera assembly and the second camera assembly are vertically spaced apart,
wherein the hole is a first hole, the case further includes a second hole, and the first hole and the second hole respectively correspond to the first camera assembly and the second camera assembly,
wherein the groove is a first groove, the insulating member further includes a second groove, and the first groove and the second groove respectively correspond to the first camera assembly and the second camera assembly.

9. The refrigerator according to claim 1, wherein the storage room comprises a first storage, and a second storage disposed below the first storage, and
wherein the camera assembly is a first camera assembly, disposed to photograph the first storage, and the rotation bar further comprises a second camera assembly, disposed below the first camera assembly to photograph the second storage,
wherein the hole is a first hole, the case further includes a second hole, and the first hole and the second hole respectively correspond to the first camera assembly and the second camera assembly,
wherein the groove is a first groove, the insulating member further includes a second groove, the first groove and the second groove respectively correspond to the first camera assembly and the second camera assembly.

10. The refrigerator according to claim 1, comprising:
a display disposed on a front portion of at least one of the first door or the second door,
wherein information photographed by the camera assembly is output to the display or an external communication device.

11. The refrigerator according to claim 6, wherein the rotation bar comprises a plurality of camera assemblies including the camera assembly,
wherein the case includes a plurality of holes respectively corresponding to the plurality of camera assemblies, the plurality of holes including the hole, and
wherein the insulating member includes a plurality of grooves respectively corresponding to the plurality of camera assemblies, the plurality of grooves including the groove.

12. The refrigerator according to claim 6, wherein the heating device is configured to surround the camera.

13. The refrigerator according to claim 5, wherein the first camera assembly is located at a side portion of an uppermost hinge bracket of the plurality of hinge brackets, and
the second camera assembly is located below another hinge bracket of the plurality of hinge brackets that is located below the uppermost hinge bracket of the plurality of hinge brackets.

* * * * *